Nov. 19, 1929. C. L. MATTISON ET AL 1,735,906
WOOD TURNING MACHINE
Filed July 1, 1925   3 Sheets-Sheet 3
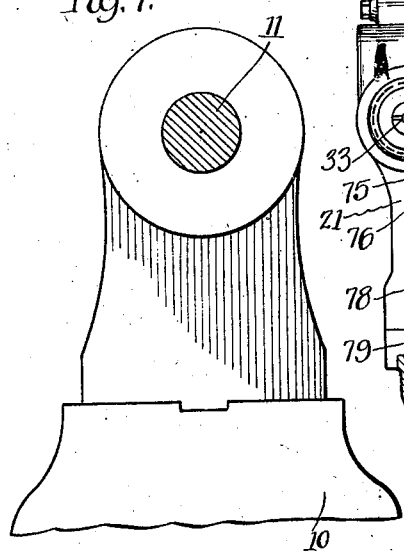
Fig. 7.
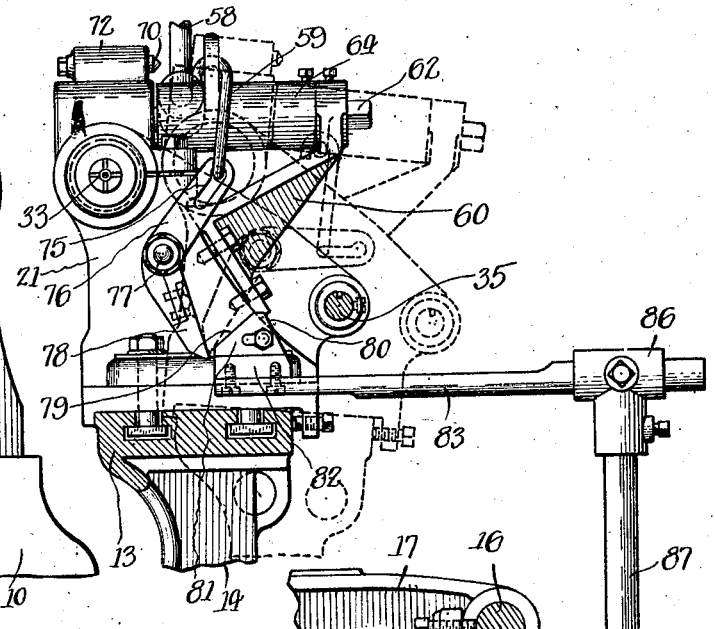
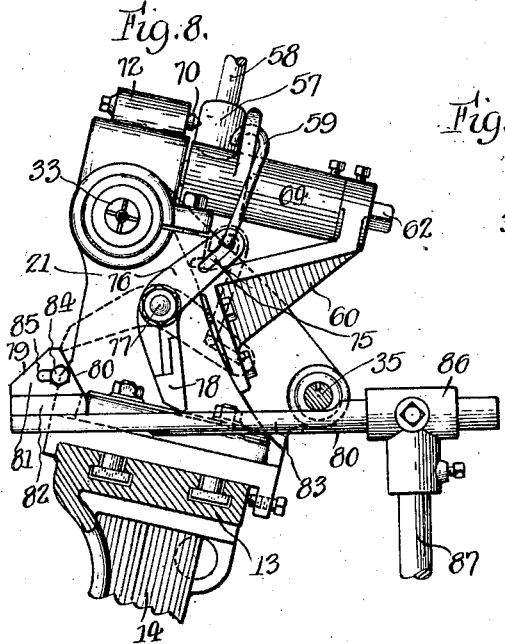
Fig. 8.
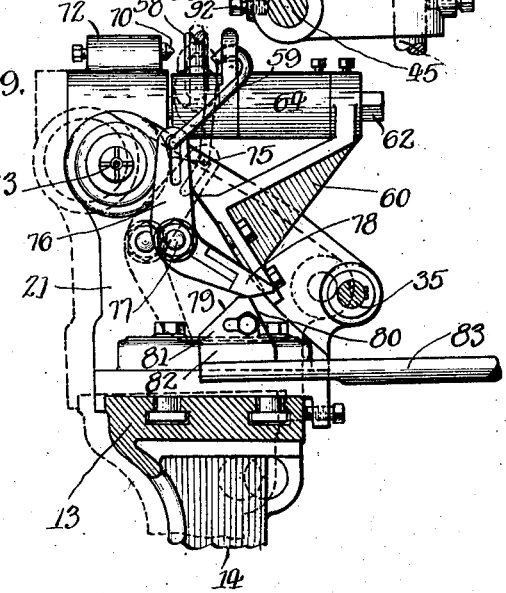
Fig. 9.
Inventors:
Carl L. Mattison,
Charles E. La Pointe,
By Chindahl Parker Carlson
Attys.

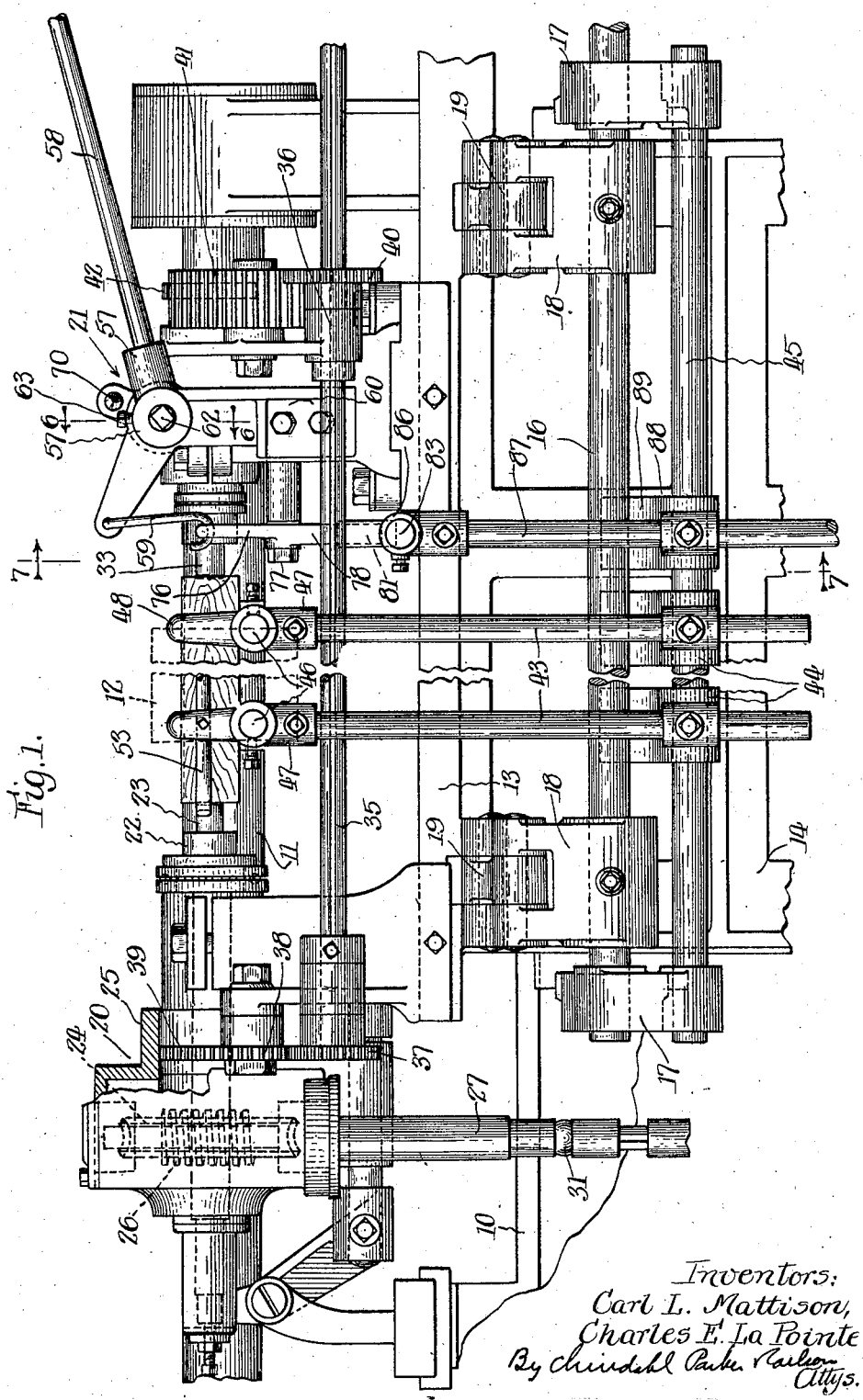

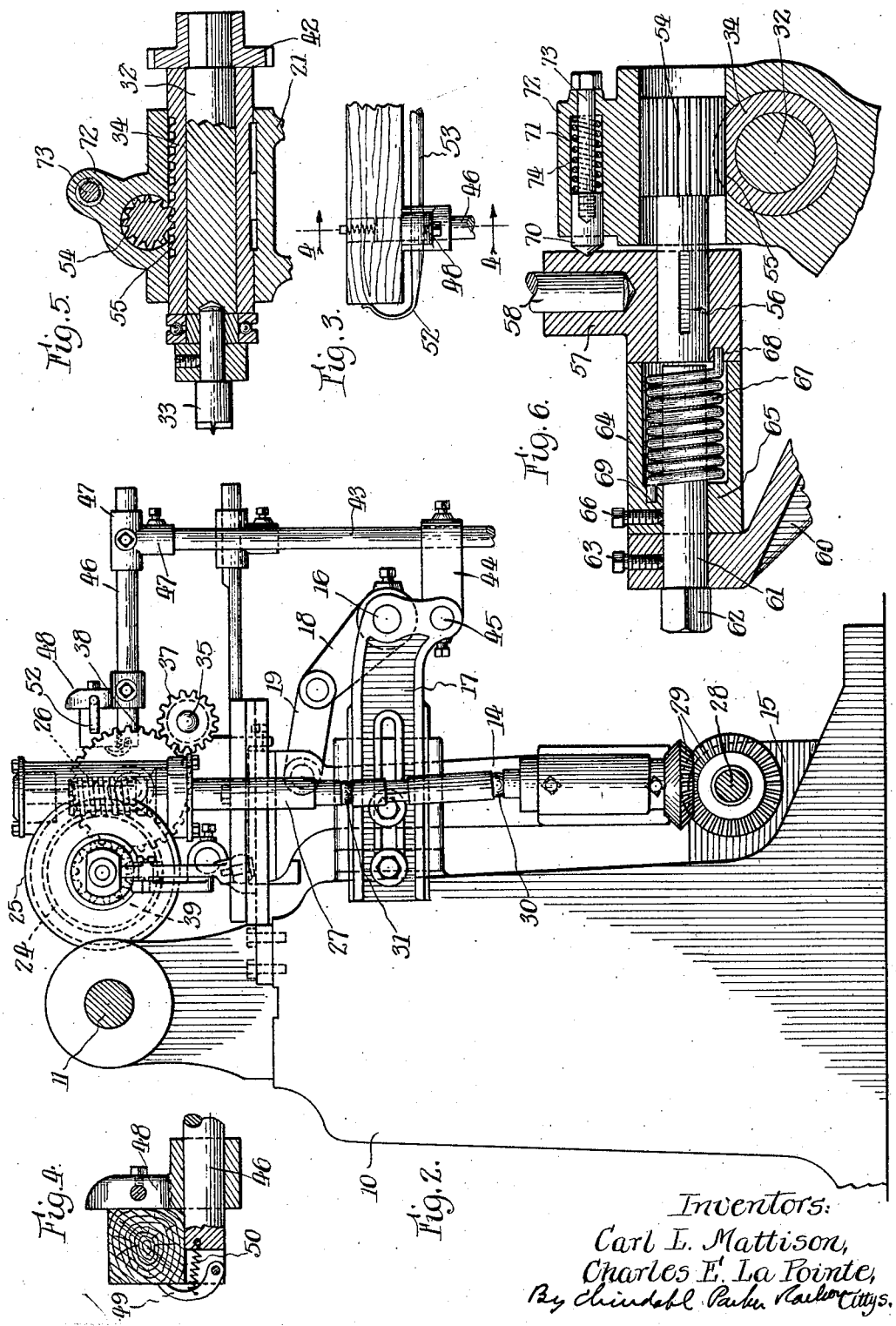

Patented Nov. 19, 1929

1,735,906

UNITED STATES PATENT OFFICE

CARL LAWRENCE MATTISON AND CHARLES EDWARD LA POINTE, OF ROCKFORD, ILLINOIS, ASSIGNORS TO MATTISON MACHINE WORKS, OF ROCKFORD, ILLINOIS, A CORPORATION OF ILLINOIS

WOOD-TURNING MACHINE

Application filed July 1, 1925. Serial No. 40,728.

In wood-turning machines, the work is commonly mounted between a headstock spindle and a tailstock spindle on a swinging table, and the latter is moved back and forth manually between an operative position in which the cutter engages the work and an inoperative position remote from the cutter in which the finished work is released and new work substituted. Heretofore the finished work has been released and the new work clamped in place by manually moving the spindles axially relatively to each other when the table is positioned away from the cutter. By loading and unloading the work and moving the table manually, a heavy burden requiring special skill is placed upon the operator. The primary object of the present invention therefore is to provide means for automatically loading and unloading the machine, thereby simplifying the manipulation, and resulting in a saving of time and in increased efficiency of production.

More specifically the invention contemplates the provision of means automatically operable as the table is moved toward and into its inoperative position to move the spindles relatively to release the finished work and then to clamp new work in place.

A further object is to provide means of the above character which is adjustable so as to to be manually operable to secure the new work in place after the finished work has been automatically released.

Still another object is to provide means for automatically releasing the work which is operated by movement of the table toward inoperative position, but which is unaffected by the return movement of the table to operative position.

Other objects reside in the specific construction of the above means and in the means for supporting and centering the work preparatory to clamping it between the centers.

In the accompanying drawings, Figure 1 is a fragmentary front elevational view of a wood-turning machine embodying the features of our invention.

Fig. 2 is a fragmentary elevational view of one end of the machine, the driving shaft being shown in section.

Fig. 3 is a fragmentary view of the work support.

Fig. 4 is a fragmentary sectional view taken along line 4—4 of Fig. 3.

Fig. 5 is a fragmentary vertical sectional view of the tailstock, the view being taken longitudinally of the machine.

Fig. 6 is a fragmentary sectional view of the tailstock taken along line 6—6 of Fig. 1.

Fig. 7 is a fragmentary sectional view taken substantially along line 7—7 of Fig. 1, and showing the tailstock in its operative position relative to the cutter, the dotted lines indicating its position just after the work center has been retracted to release the work.

Fig. 8 is a view similar to Fig. 7, but showing the tailstock in its inoperative position, i. e., in its greatest distance from the cutter, the dotted lines indicating the position of the means for separating the work centers just before a new piece of work is clamped in place.

Fig. 9 is a view similar to Fig. 8 showing the tailstock on its return movement to operative position.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

The machine herein shown comprises a main frame or base 10 on which is mounted for rotation a cutter spindle 11 supporting a cutter 12 shown diagrammatically in Fig. 1. The work is supported upon a swinging table 13 mounted for movement toward and away from the cutter. The table 13 is carried upon the upper end of an upright frame 14 having its lower end pivotally supported in suitable bearings 15 at the lower forward side of the base.

Means is provided for swinging the table toward and away from the frame 10 which in the present instance consists of a rock shaft 16 supported a substantial distance forwardly of the frame upon forwardly extending brackets 17 secured to the frame so as to be adjustable forwardly and rearwardly relative thereto. A pair of lever arms 18 fast on the rock shaft 16 are pivotally connected by links 19 with the frame 14. These arms and links constitute toggles for moving the table toward and away from the cutter when the shaft 16 is rocked.

Upon the table are supported a headstock 20 and a tailstock 21 adapted for adjustment in a well known way. The headstock comprises a spindle 22 at the forward end of which is suitably secured a spur center 23 and on the rear end of which is secured a worm wheel 24 enclosed within a suitable housing 25 also enclosing a worm 26 on the upper end of an upright shaft 27. The worm wheel and worm are arranged to mesh for the purpose of transmitting motion from the shaft 27 to the spindle 22, the shaft 27, being operatively connected at its lower end with a drive shaft 28 (see Fig. 2) through the medium of bevel gearing 29 in order to permit of the swinging movement of the table toward and away from the main frame 10. A pair of universal couplings 30 and 31 are provided in the shaft 27.

The tailstock 21 comprises a spindle 32 carrying at its inner end a spur center 33. Herein the spindle 32 is shown as being mounted in the tailstock bearing through the medium of a sleeve 34 (see Fig. 5) which is arranged to be reciprocated to move the spur center 33 toward and away from the center 23. In order that both centers 23 and 33 may be driven in synchronism an operative connection is provided between the spindles 22 and 32 comprising a shaft 35. One end of the shaft is mounted in the headstock for rotational but non-longitudinal movement, and the other end is slidable through a suitable bearing 36 on the tailstock. The shaft 35 is connected through a pinion 37, an intermediate gear 38 and a drive gear 39 to the headstock spindle 22, and similarly through a gear 40, an intermediate gear 41 and a gear 42 to the tailstock spindle 32. To permit longitudinal movement of the sleeve 34, the intermediate gear 41 is made of substantial width so that the driven pinion 42 will move axially relative to the gear in the longitudinal movements of the spindle.

The work to be turned is placed on a work support which serves to so locate the work that it will be positioned between and in axial alinement with the centers 23 and 33 when the table 13 is in its inoperative or loading position. This work support comprises a pair of vertical standards 43, the lower ends of which are adustably clamped in a pair of brackets 44. These brackets in turn are adjustably clamped on a horizontal rod 45 rigidly mounted at its opposite ends in the brackets 17. A pair of horizontal rods 46 are adjustably clamped in two sleeves 47, one of which is mounted on the upper end of each standard 43, and extend transversely of the machine. The inner ends of the rods 46 are adapted to support the ends of the work, and are provided with adjustable brackets 48, one for each rod, for defining the lateral position of the work. The brackets 48 may be of a height suitable to support any desired number of work pieces to be turned in successive operations, and in the present instance support one work piece. It will be evident that the work support is universally adjustable to adapt it to a wide variety of work, and to support the work in the desired position.

A pair of levers 49 (see Fig. 4), pivotally mounted in the split ends of the rods 46, are resiliently held by coiled springs 50 in engagement with the work, and serve to hold the latter squarely against the brackets 48. The work is centered longitudinally on the work support so that when the table is withdrawn to clamp the new work piece, the centers will clear the ends of the work. This is accomplished by means of a curved spring arm 52 which engages one end surface of the work and which is formed on one end of a rod 53 extending through one of the brackets 48. The arm 52 is positioned (Fig. 1) so that the end of a work piece in abutment therewith will be cleared by the headstock center 23 and retraction of the tailstock center 33 to its unclamped position insures that it will clear the other end of the work piece.

Means is provided for automatically reciprocating the sleeve 34 to release the finished work as the table 13 is moved away from the cutter, and to clamp the new work between the centers 23 and 33 as the table moves into its inoperative or loading position. This means comprises a pinion 54 housed in the frame of the tailstock 21 and meshing with a longitudinal rack 55 formed on the sleeve 34. Keyed to a stub shaft 56 on the pinion 54 is a bell crank lever 57 one arm of which is provided with a handle 58 for manually actuating the sleeve 34. The other arm of the lever 57 is operatively connected through a link 59 with mechanism to be hereinafter described for separating the centers 23 and 33 to release the work.

Secured to the frame of the tailstock 21 is a bracket 60 which is inclined upwardly and forwardly therefrom. A shaft 61 having a square end 62 adapted to receive a suitable crank lever (not shown) extends through the upper end of the bracket 60, and is adjustably clamped therein by means of a set screw 63. A cylindrical sleeve 64 fits snugly between the hub of the bell crank lever 57 and the bracket 60, and is formed with an end wall 65 next to the latter. The shaft 61 extends through the end wall 65, and is clamped therein by means of a set screw 66. Wound around the shaft 61 in the sleeve 64 is a coil spring 67, the opposite ends of which engage respectively in depressions 68 and 69 in the hub of the bell crank lever 57 and the end wall 65. The spring 67 tends to move the sleeve 34 to the left to clamp the work positioned on the work support between the centers 23 and 33, and resists movement of the sleeve in the opposite direction. The tension of the spring 67 can be adjusted by loosening the set screw 63, rotatably adjusting the shaft 61 to the desired extent, and retightening the set screw. Upon loosening the set screw 66, the sleeve 64 will rotate on the shaft 61, thereby releasing the tension in the spring, and making the machine semi-automatic. The work will still be automatically released, but to clamp the new work in place the spindle 32 must be actuated manually by means of the handle 58. This change may be desirable where an operator finds it difficult to position the work correctly on the support in time to be clamped automatically.

A pointed plunger 70 is slidably mounted in the bore 71 of a tubular enlargement 72 on the frame of the tailstock 21. One end of the bore 71 is closed, and a headed bolt 73 extends through said closed end and is threaded into the inner end of said plunger. Mounted between the inner end of the plunger 70 and the closed end of the bore 71 is a coil spring 74 which tends to move the plunger outwardly to yieldingly engage the lever 57 as the latter is moved past from one extreme position into the other. The outward movement of the plunger 70 is limited by the bolt 73.

The link 59 which is loosely connected to the bell crank lever 57 also loosely engages in an elongated slot 75 in the upper end of a bell crank lever 76 mounted on a stud 77. The lower arm of the lever 76 is provided with a hardened point 78 which is adapted to engage opposite inclined cam surfaces 79 and 80 on a cam block 81 as the table moves from and toward the cutter 12. While any suitable means may be employed to support the cam block 81 rigidly with respect to the machine base 10, preferably the block is mounted on an angle shaped base 82 secured to the end of a trip bar 83. The cam block 81 is adjustably secured to the base 82 by means of a bolt 84 extending through a slot 85 in the former. The trip bar 83 is adjustably clamped in a sleeve 86 on the upper end of a vertical standard 87 adjustably clamped in a brackets 88 on the rod 45. To provide means for adjusting the cam surfaces 79 and 80 angularly, the bracket 88 is formed with a curved arm 89 extending upwardly beyond the shaft 16. A screw 91 is threaded through this arm into engagement with the shaft 16, and upon being adjusted will tilt the supporting structure for the cam block 81 about the rod 45. A set screw 92 provides means for locking the structure in place.

In operation, the table 13 with a new piece of work clamped between the centers is moved from its inoperative position which is shown in Fig. 8, toward the cutter. In this movement the cam lever 76 is oscillated by the cam block 81, but due to the direction and range of this oscillation and the shape of said cam lever, the lever 57 is not oscillated. The slot 75 permits the connection between the link 59 and the lever 76 to pass through dead center without affecting the lever 57. The work is moved against the cutter by tilting the table 13 toward the cutter to its operative position. This position of the table is illustrated in full lines in Fig. 7, and in dotted outline in Fig. 9. When the work has been finished the table 13 is returned toward its inoperative position. In so doing, the lower end of the bell crank lever 76 engages the cam block 81 and is oscillated thereby to lower its upper arm and retract the spindle 32 to release the finished work. The dotted outline in Fig. 7 shows the position of the machine parts just after the work has been released. As the table is moved into its loading position, the lever 76 passes over the upper front edge of the cam block 81 (see dotted outline in Fig. 8), and under the influence of the spring 67 is returned to its initial position. A new piece of work which had previously been centrally positioned on the work support is thereby automatically clamped between the centers 23 and 33, and the above operation is repeated.

By loosening the screw 66, the machine can be made semi-automatic, requiring the new work to be clamped in place by manual operation.

By providing means for automatically loading and unloading the machine, the operator is required only to place the work on the work support and to tilt the table, thereby lightening the work and substantially increasing the speed and efficiency at which the machine can be operated.

We claim as our invention:

1. A wood-turning machine having in combination, a main frame having a cutter mounted thereon, a table having a pair of spindles mounted in spaced relation, said table being movable to carry the work into and out of engagement with the cutter, driving means for said spindles, and means for automatically releasing the work and clamping new work in place as the table is moved away from the cutter, said means comprising a stationary cam, a dog pivotally mounted on said table adapted to engage said cam, a rockable lever geared to one of said spindles, and a link connecting said dog and lever.

2. A wood-turing machine having, in combination, a main frame having a cutter mounted thereon, a table having a pair of work supporting spindles, said table being movable toward and from the cutter, a sleeve supporting one of said spindles, spring means for moving said sleeve in one direction to secure the work between said spindles, a bell crank lever operatively connected to said sleeve for moving said sleeve against the force of said spring, and cam means for engaging said lever to release the work as said table is moved toward inoperative position and for releasing said lever when said table reaches its inoperative position to permit said spring to clamp the new work in position, and means connecting said sleeve and said lever including a lost motion device to render the movement of said lever ineffectual on the return stroke to operative position to actuate said sleeve.

3. A wood-turning machine having, in combination, a cutter, a table having a work supporting means, said table being movable toward and from said cutter, means automatically operable upon movement of said table away from said cutter to actuate said first mentioned means to release the work, spring means operatively connected to said first mentioned means for actuating the latter to clamp new work on the table when said table is moved into a predetermined position, said spring means being adapted to be disconnected from said first mentioned means, and means for manually actuating said first mentioned means to clamp new work on the table.

4. A wood-turning machine having, in combination, a main frame having a cutter mounted thereon, a table having a pair of spindles mounted in spaced relation, said table being movable to carry the work into and out of engagement with the cutter, driving means for said spindles, means normally urging one of said spindles axially to work clamping position, means for automatically releasing the work and clamping new work in place, said means comprising a member movably mounted on said table and adapted to abut a stationary part on said frame during movement of said table from the cutter and to be moved relative to said table by such engagement, and means connecting said member and said spindle effective during the movement of said table from the cutter to actuate the spindle and ineffective during the return movement of the table toward the cutter to actuate the spindle.

5. A wood-turning machine having, in combination, a main frame having a cutter mounted thereon, a pair of work supporting spindles mounted on a second frame, one of said frames being movable toward and from the other, one of said spindles being mounted so as to permit of longitudinal movement thereof, spring means for moving said spindle in one direction to secure the work between said spindles, and means for moving said spindle in the other direction against the force of said spring, said means comprising a lever on said second frame having a lost motion connection with said spindle, means on the other frame arranged to engage said lever to release the work as the movable frame is moved toward inoperative position, said lost motion connection serving to prevent operation of said releasing means on the return movement of said movable frame to its operative position.

6. A wood-turning machine having, in combination, a first frame having a cutter mounted therein, a second frame having a pair of work supporting spindles, one of said frames being movable toward and from the other, and one of said spindles being arranged to permit of longitudinal movement, spring means for moving the spindle in one direction to secure the work between said spindles, and means for moving said spindle in the other direction against the force of said spring to release the work, said means comprising a lever on said second frame operatively connected to said spindle to cause longitudinal movement of said spindle when said lever is moved, a bell crank on said second frame having a longitudinal slot in one arm thereof, a link having one end pivotally connected to said first lever and the other end slidably engaging said slot, and means on said first frame arranged to be engaged by the other arm of said bell crank to cause rocking movement of said bell crank, said link serving to transmit such movement to the lever when the frames are separated and the slotted connection between said link and said lever serving to prevent transmission of this movement to the lever as the frames are moved together.

In testimony whereof we have hereunto affixed our signatures.

CARL L. MATTISON.
CHARLES EDWARD LA POINTE.